US009742721B2

(12) United States Patent
Li et al.

(10) Patent No.: US 9,742,721 B2
(45) Date of Patent: Aug. 22, 2017

(54) METHOD, SYSTEM, SERVER AND CLIENT DEVICE FOR MESSAGE SYNCHRONIZING

(71) Applicant: Tencent Technology (Shenzhen) Company Limited, Shenzhen, Guangdong (CN)

(72) Inventors: Liangjing Li, Shenzhen, Guangdong (CN); Zhixing Chen, Shenzhen, Guangdong (CN); Changqing Yu, Shenzhen, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 396 days.

(21) Appl. No.: 14/302,043

(22) Filed: Jun. 11, 2014

(65) Prior Publication Data

US 2014/0297727 A1    Oct. 2, 2014

Related U.S. Application Data

(63) Continuation of application No. PCT/CN2013/088515, filed on Dec. 4, 2013.

(30) Foreign Application Priority Data

Feb. 28, 2013   (CN) .......................... 2013 1 0063804

(51) Int. Cl.
*G06F 15/16* (2006.01)
*H04L 12/58* (2006.01)

(52) U.S. Cl.
CPC .............. *H04L 51/34* (2013.01); *H04L 51/22* (2013.01)

(58) Field of Classification Search
USPC ........ 709/203, 204, 205, 206, 223, 224, 248
See application file for complete search history.

(56) References Cited

U.S. PATENT DOCUMENTS

| 2004/0153483 | A1* | 8/2004 | Cox ........................ H04L 51/38 |
| 2008/0146194 | A1  | 6/2008 | Yang et al. |
| 2011/0231478 | A1* | 9/2011 | Wheeler ........... G06F 17/30864 709/203 |

(Continued)

FOREIGN PATENT DOCUMENTS

CN    102740274 A    10/2012

OTHER PUBLICATIONS

International Search Report issued Feb. 27, 2014 in International Application No. PCT/CN2013/088515.

*Primary Examiner* — Liangche A Wang
(74) *Attorney, Agent, or Firm* — Brinks Gilson & Lione

(57) ABSTRACT

A message synchronizing method, a message synchronizing system, a server and a client device are disclosed. In the method, a server acquires a shared message with an unread mark corresponding to a first communication account after at least one client device logs into the first communication account; the server sends the shared message with the unread mark to each of the at least one client device; if the server receives a read mark reported by any of the at least one client device after the shared message with the unread mark is read by the any of the at least one client device, the server performs synchronization, for the read mark, on each of the at the least one client device except the client device reporting the read mark. Message reading states among client devices for same communication account are synchronized.

15 Claims, 11 Drawing Sheets

(56) References Cited

U.S. PATENT DOCUMENTS

2012/0009916 A1* 1/2012 Prikowitsch ...... G06F 17/30578
                                                    455/422.1
2012/0210334 A1* 8/2012 Sutedja ................ G06Q 10/107
                                                      719/314
2012/0303716 A1   11/2012 Peters et al.

* cited by examiner

METHOD, SYSTEM, SERVER AND CLIENT DEVICE FOR MESSAGE SYNCHRONIZING

PRIORITY STATEMENT

This application is a continuation of International application PCT/CN2013/088515, filed on Dec. 4, 2013 which claims the priority to Chinese Patent Application No. 201310063804.1, entitled "METHOD, SYSTEM, SERVER AND CLIENT DEVICE FOR MESSAGE SYNCHRONIZING", filed with the Chinese State Intellectual Property Office on Feb. 28, 2013, which are incorporated by reference in their entirety herein.

TECHNICAL FIELD

The disclosure relates to the field of internet technology, specifically the field of instant messaging technology, and in particular to a message synchronizing method, a message synchronizing system, a server and a client device.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admission of prior art.

With the development of the internet technology and the client device technology, most of internet applications support the case that multiple client devices log into a same communication account (including login at the same time and login at different time). Traditionally, when multiple client devices log into a same communication account, message states among the client devices are generally asynchronous, and a message which has been read at a client device is still reminded to the user as an unread message at other client device, thereby affecting user experience.

SUMMARY

A message synchronizing method, a message synchronizing system, a server and a client device are provided by embodiments of the present disclosure.

In a first aspect of the disclosure, a message synchronizing method is provided. The method is performed by a server, for synchronizing messages between a plurality of client devices common to a first communication account, including:

acquiring an unread message to be shared among the plurality of devices when the first of the plurality of client devices logs into the user communication account, where the shared message includes an unread mark;

sending the shared message including the unread mark to each of the plurality of client devices, and when the shared message is read by one of the plurality of client devices for the first time, receiving a read mark reported by the client device that first reads the shared message; and performing synchronization, for the read mark, on each of the plurality of client devices except the client device reporting the read mark.

In a second aspect of the present disclosure, another message synchronizing method is provided. The method is performed by one of a plurality of client devices common to a first communication account and in communication with a server, for synchronizing messages between the plurality of client devices, including:

receiving from the server an unread message to be shared by the plurality of client devices and corresponding to a first communication account after the client device logs into the first communication account, where the shared message includes an unread mark;

outputting read reminding information according to the shared message including the unread mark; and generating a read mark when detecting that a user reads the shared message including the unread mark according to the read reminding information; and reporting to the server the read mark, which renders the server to perform synchronization, for the read mark, on at least one other client device of the plurality of client devices that logs into the first communication account.

In a third aspect of the present disclosure, a server in communication with a plurality of client devices is provided, which may include:

a storage medium including a program; and a processor in communication with the storage medium configured to execute the program to:

acquire an unread message corresponding to a first communication account and to be shared among a plurality of client device common to the first communication account, when the first of the plurality of client devices logs into the first communication account, where the shared message includes an unread mark;

send the shared message including the unread mark to each of the plurality of client devices when the shared message is read by one of the plurality of client devices for the first time, receive a read mark reported by the client device that first read the shared message; and perform synchronization, for the read mark, on each of the plurality of client devices except the client device reporting the read mark.

In a fourth aspect of the present disclosure, a client device in communication with a server is provided, which may include:

a storage medium including a program; and a processor in communication with the storage medium configured to execute the program to:

receive from the server an unread message corresponding to a first communication account and to be shared among a plurality of client devices common to the first communication account, after the client device logs into the first communication account, where the shared message includes an unread mark;

output read reminding information according to the shared message including the unread mark generate a read mark when detecting that a user reads the shared message including the unread mark according to the read reminding information; and report to the server the read mark, which renders the server to perform synchronization, for the read mark, on at least one other client device of the plurality of client devices that logs into the first communication account.

In a fifth aspect of the present disclosure, a message synchronizing system is provided, which may include a server provided in the third aspect described above and at least one client device provided in the fourth aspect described above.

In the embodiments of the disclosure, after at least one client device logs into the first communication account, the server acquires the shared message with the unread mark corresponding to the first communication account and sends the shared message to each of the at least one client device, therefore, message synchronization among the client devices that log into the same communication account can be ensured by sending the same unread message to the client devices by the server. In addition, if the server receives a read mark reported by any of the at least one client device after the shared message with the unread mark is read by the any of the at least one client device, the server performs synchronization, for the read mark, on each of the at least one client device, and the read mark can ensure the synchronization of the reading states of the messages among the client devices, therefore, repeated unread reminding for the same message at the client devices is avoided to some extent, thereby improving the intelligence of the client device, and improving the reading experience for the user.

BRIEF DESCRIPTION OF THE DRAWINGS

In order to illustrate the technical solutions of the embodiments of the disclosure or the prior art more clearly, the accompanying drawings to be used in the description of the embodiments or the prior art are simply described below. Obviously, the accompanying drawing described below are only some embodiments of the disclosure, other accompanying drawings may be obtained by those skilled in the art based on these accompanying drawings without any creative work.

DETAILED DESCRIPTION

The technical solutions of the embodiments of the disclosure are described clearly and completely below in conjunction with the accompanying drawings of the embodiments of the disclosure. Obviously, the described embodiments are only some embodiments of the disclosure. Other embodiments obtained by those skilled in the art based on the embodiments of the disclosure without any creative work fall within the scope of protection of the disclosure.

Figure 16:
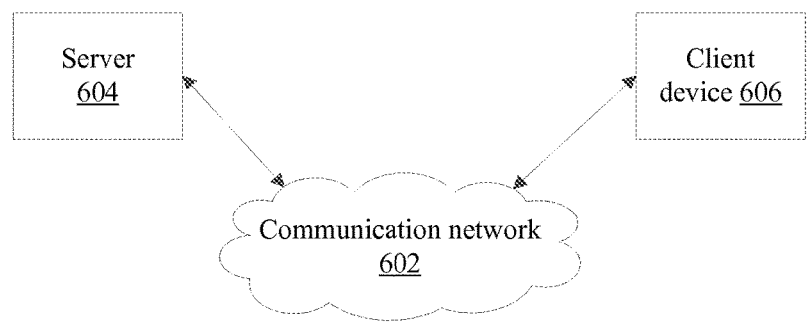
FIG. 16 depicts an exemplary environment incorporating certain disclosed embodiments.

FIG. 16 depicts an exemplary environment 600 incorporating exemplary methods and systems for message synchronizing in accordance with various disclosed embodiments. As shown in FIG. 16, the environment 600 can include a server 604, a client device 606, and a communication network 602. The server 604 and the client device 606 may be coupled through the communication network 602 for information exchange. Although only one client device 606 and one server 604 are shown in the environment 600, any number of client device 606 or servers 604 may be included, and other devices may also be included.

The communication network 602 may include any appropriate type of communication network for providing network connections to the server 604 and client device 606 or among multiple servers 604 or client device 606. For example, the communication network 602 may include the Internet or other types of computer networks or telecommunication networks, either wired or wireless.

A client device, as used herein, may refer to any appropriate client device with certain computing capabilities, e.g., a personal computer (PC), a work station computer, a hand-held computing device (e.g., a tablet), a mobile terminal (e.g., a mobile phone or a smart phone), or any other client-side computing device.

A server, as used herein, may refer to one or more server computers configured to provide certain server functionalities. A server may also include one or more processors to execute computer programs in parallel.

Figure 12:
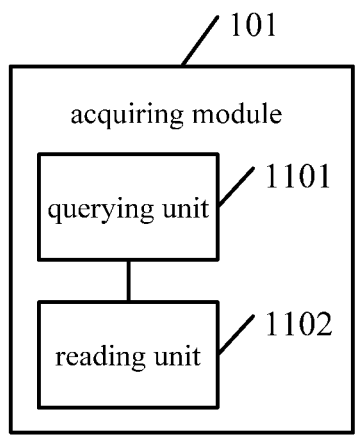
FIG. 12 is a schematic structural diagram of an acquiring module of a server provided by an embodiment of the disclosure.
Figure 17:
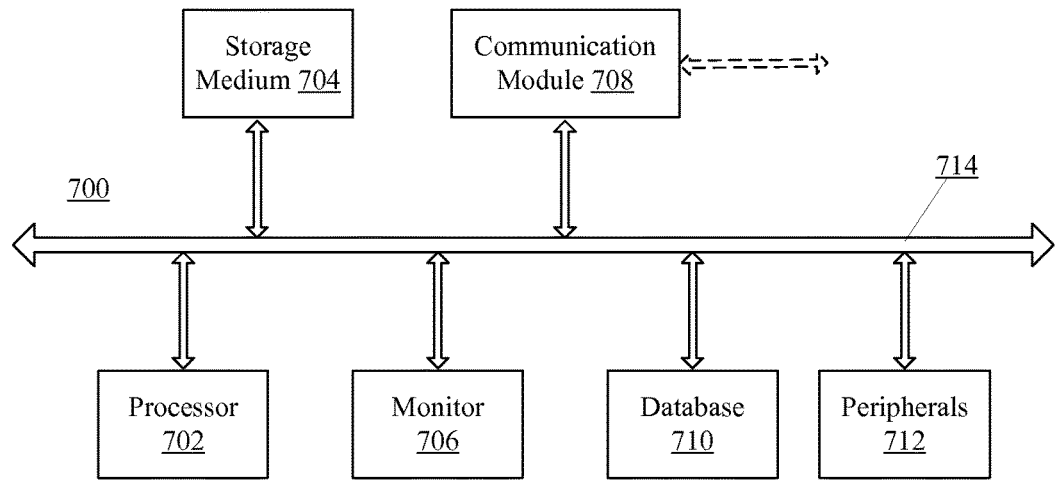
FIG. 17 depicts an exemplary computing system consistent with the disclosed embodiments.

The server 604 and the client device 606 may be implemented on any appropriate computing platform. FIG. 12 shows a block diagram of an exemplary computing system 700 (or computer system 700) capable of implementing the server 604 and/or the client device 606. As shown in FIG. 17, the exemplary computer system 700 may include a processor 702, a storage medium 704, a monitor 706, a communication module 708, a database 710, peripherals 712, and one or more bus 714 to couple the devices together. Certain devices may be omitted and other devices may be included.

The processor 702 can include any appropriate processor or processors. Further, the processor 702 can include multiple cores for multi-thread or parallel processing. The storage medium 704 may include memory modules, e.g., Read-Only Memory (ROM), Random Access Memory (RAM), and flash memory modules, and mass storages, e.g., CD-ROM, U-disk, removable hard disk, etc. The storage medium 704 may store computer programs for implementing various processes, when executed by the processor 702.

The monitor 706 may include display devices for displaying contents in the computing system 700. The peripherals 712 may include I/O devices such as keyboard and mouse.

Further, the communication module 708 may include network devices for establishing connections through the communication network 602. The database 710 may include one or more databases for storing certain data and for performing certain operations on the stored data.

In operation, the client device 606 may cause the server 604 to perform certain actions. The server 604 may be configured to provide structures and functions for such actions and operations.

In various embodiments, a terminal involved in the disclosed methods and systems can include the client device 606, while a server involved in the disclosed methods and systems can include the server 604. The methods and systems disclosed in accordance with various embodiments can be executed by a computer system. In one embodiment, the disclosed methods and systems can be implemented by a server.

Various embodiments provide methods and systems for message synchronizing. The methods and systems are illustrated in various examples described herein.

The message synchronizing method provided by the embodiments of the disclosure is described in detail below in conjunction with FIG. 1 to FIG. 8.

Figure 1:
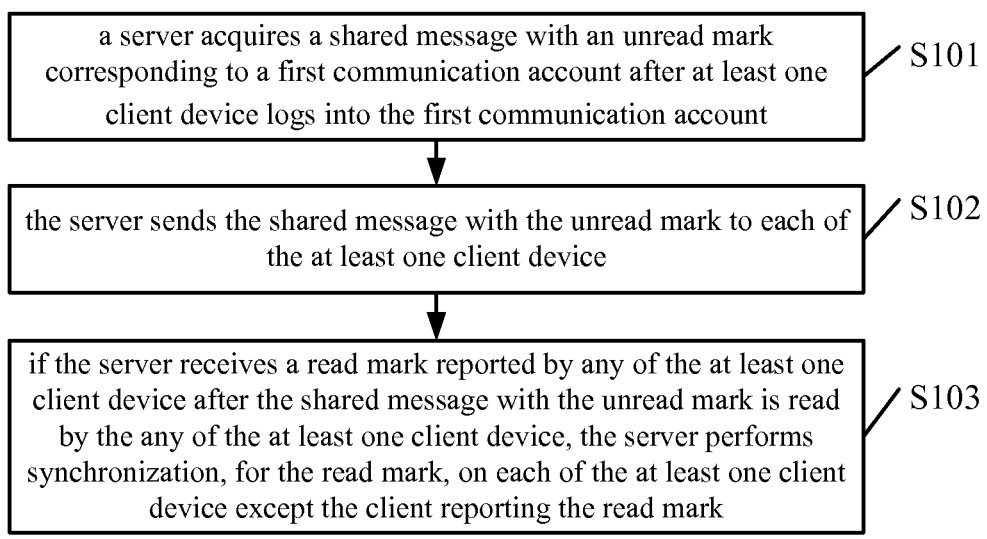
FIG. 1 is a flowchart of a message synchronizing method provided by an embodiment of the disclosure.

FIG. 1 is a flowchart of a message synchronizing method provided by an embodiment of the disclosure. In the embodiment, the process of the message synchronizing method is described from a point of a server side. The method may include the following steps S101 to S103.

S101 includes, the server acquires a shared message with an unread mark corresponding to a first communication account after at least one client device logs into the first communication account.

If the client device logs into the first communication account of an instant messaging application, the first communication account is an instant messaging account of the instant messaging application. If the client device logs into the first communication account of a browser application, the first communication account is a communication account of the browser application. If the client device logs into the first communication account of a SNS (Social Networking Services) application, the first communication account is a SNS communication account of the SNS application. There may be only one client device that logs into a communication account, for example, the PC terminal logs into a communication account A of the instant messaging application, and a user A corresponding to the communication account A may communicate with other users by using the instant messaging application at the PC terminal. Alternatively, Multiple devices may log into a communication account, for example, both the PC terminal and the mobile phone terminal log into the communication account A of the instant messaging application, so the user A corresponding to the communication A may communicate with other users by using the instant messaging application at the PC terminal and the mobile phone terminal.

In the embodiment of the disclosure, a server manages all shared messages of a same communication account. For example, if both the PC terminal and the mobile phone terminal log into the first communication account of the instant messaging application, the server collectively manages all instant messaging messages of the instant messaging application used by the user of the communication account at the PC terminal and the mobile phone terminal, including all the read instant messaging messages and all the unread instant messaging messages of the communication account. In this step, after the at least one client device logs into the first communication account, the server acquires a shared message with an unread mark corresponding to the first communication account, that is, the server acquires an unread message corresponding to the first communication account.

S102 includes, the server sends the shared message with the unread mark to each of the at least one client device.

In this step, the server sends the shared message with the unread mark to each of the at least one client device, such that any of the at least one client device may output read reminding information according to the shared message with the unread mark, to remind the user to read the shared message with the unread mark in time. In this step, messages among the client devices that log into the first communication account can be maintained to be consistent, thereby achieving message synchronization among the client devices for the same communication account.

S103 includes, if the server receives a read mark reported by any of the at least one client device after the shared message with the unread mark is read by the any of the at least one client device, the server performs synchronization, for the read mark, on each of the at least one client device except the client device reporting the read mark.

In this step, the server receives a read mark reported by any of the at least one client device after the shared message with the unread mark is read by the any of the at least one client device shows that the shared message with the unread mark has been read at the client device reporting the read mark, and the reading state of the shared message with the unread mark is changed from an unread state to a read state. Furthermore, in this step, the server synchronizes the received read mark to each of the at least one client device except the client device reporting the read mark, to inform each of the at least one client device except the client device reporting the read mark about that the reading state of the shared message with the unread mark is changed from an unread state to a read state and no read reminding is needed, thereby avoiding repeated reminding for the same unread message at the client devices, and improving user experience. In this step, the reading states of the messages among the client devices that log into the first communication account can be maintained to be consistent, thereby achieving the synchronization of the reading states of the messages among the client devices for the same communication account.

In the embodiment of the disclosure, after the at least one client device logs into the first communication account, the server acquires the shared message with the unread mark corresponding to the first communication account and sends the shared message to each of the at least one terminal, and message synchronization among client devices that log into the same communication account can be ensured by sending the same unread message to the client devices by the server. In addition, if the server receives a read mark reported by any of the at least one client device after the shared message with the unread mark is read by the any of the at least on client device, the server performs synchronization, for the read mark, on each of the at least one client device, and the read mark can ensure the synchronization of the reading states of messages among the client devices, therefore, repeated unread reminding for the same message at the client devices is avoided to some extent, thereby improving the intelligence of the client device, and improving the reading experience for the user.

Figure 2:
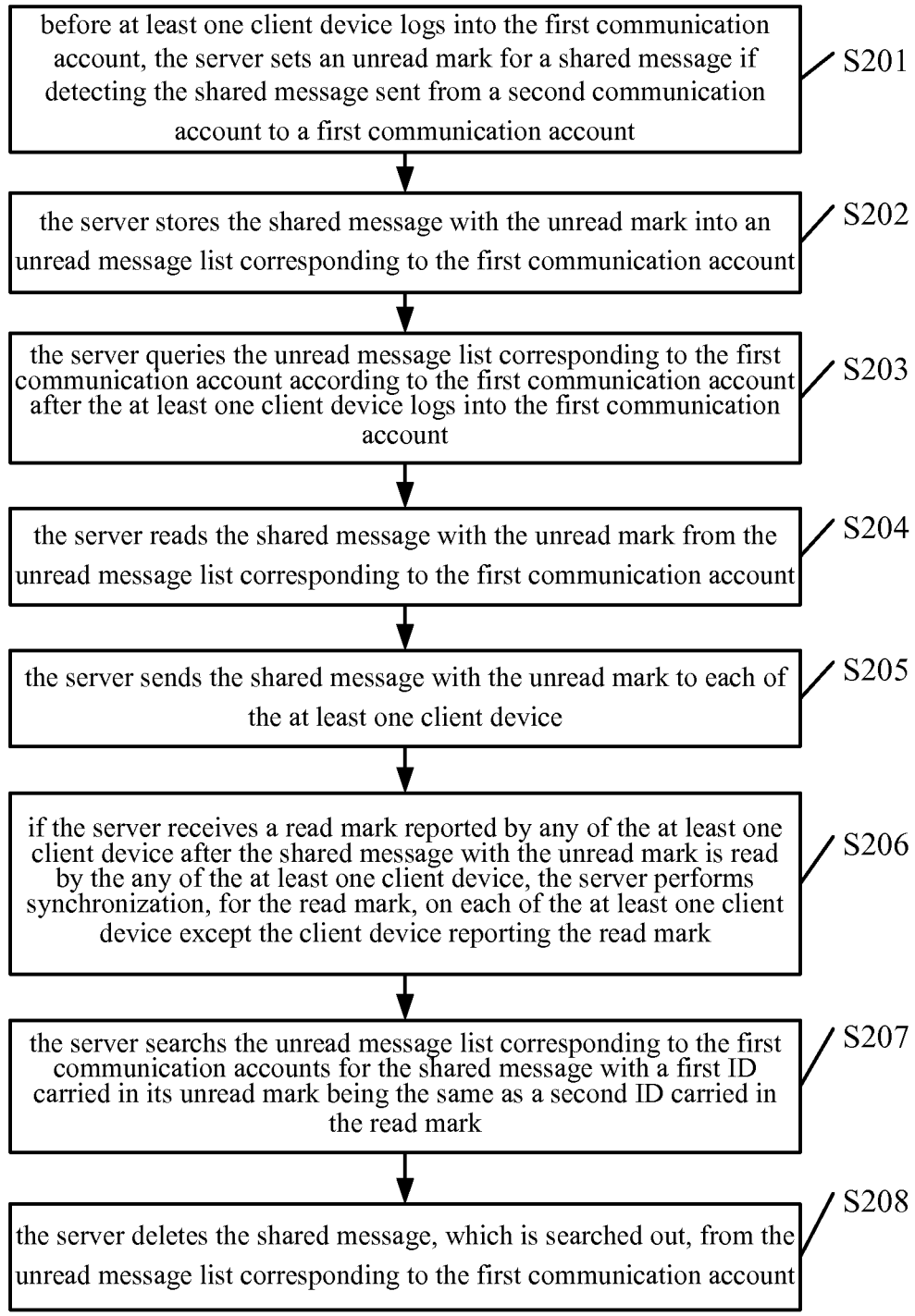
FIG. 2 is a flowchart of a message synchronizing method provided by an embodiment of the disclosure.

FIG. 2 is a flowchart of another message synchronizing method provided by an embodiment of the disclosure. In the embodiment, the process of the message synchronization method is described from a point of a server side. The method may include the following steps S201 to S208.

S201 includes, the server sets an unread mark for a shared message if detecting the shared message sent from a second communication account to a first communication account, before the at least one client device logs into the first communication account.

In the embodiment, if the client device logs into the first communication account of an instant messaging application, the first communication account is an instant messaging account of the instant messaging application, and the second communication account is an instant messaging account of the instant messaging application except the first communication account. If the client device logs into the first communication account of a browser application, the first communication account is a communication account of the browser application, and the second communication account is a communication account of the browser application except the first communication account. If the client device logs into the first communication account of a SNS application, the first communication account is a SNS communication account of the SNS application, and the second communication account is a SNS communication account of the SNS application except the first communication account.

The unread mark carries a first ID (Identity), and one first ID may be used to uniquely identify one shared message. In the step, the server sets an unread mark for the shared message sent from the second communication account shows that the shared message is an unread message corresponding to the first communication account. For example, before any client device logs into a communication account A of an instant messaging application, if the server detects a shared message a1 which is sent from a user B corresponding to a communication account B to the communication account A via any terminal (for example, a PC, a mobile phone or a tablet computer), the server assigns a first ID to the shared message a1 (for example, indicated by ID-a1), sets an unread mark A1 for the shared message a1, and includes ID-a1 in the unread mark A1, thus the shared message a1 is an unread message corresponding to the communication account A.

S202 includes, the server stores the shared message with the unread mark into an unread message list corresponding to the first communication account.

In the embodiment of the disclosure, the server stores the unread messages corresponding to the communication account in the form of a list, and forms an unread message list corresponding to the communication account. According to the example in S201 described above, provided that after S201 described above, the communication account A totally has two unread messages, including a shared message a1 with an unread mark A1 and a shared message a2 with an unread mark A2, the server stores the two unread messages into an unread message list corresponding to the communication account A in this step.

S203 includes, the server queries the unread message list corresponding to the first communication account according to the first communication account, after the at least one client device logs into the first communication account.

S204 includes, the server reads the shared message with the unread mark from the unread message list corresponding to the first communication account.

In steps S203 to S204, after the at least one client device logs into the first communication account, the server queries the unread message list corresponding to the first communication account according to the first communication account and reads the shared message with the unread mark from the unread message list. According to the examples in steps S201 to S202, after the at least one client device logs into the communication account A, total two shared messages with unread marks, including the shared message a1 with the unread mark A1 and the shared message a2 with the unread mark A2, are read from the unread message list corresponding to the communication account A in steps S203 to S204.

S205 includes, the server sends the read shared message with the unread mark to each of the at least one client device.

In the step, the server sends the read shared message with the unread mark to each of the at least one client device, such that each of the at least one client device can output read reminding information according to the shared message with the unread mark, to remind the user to read the shared message with the unread mark in time. In the step, messages among the client devices that log into the first communication account can be maintained to be consistent, thereby achieving message synchronization among the client devices that log into the same communication account.

It should be noted that, after receiving the shared message with the unread mark sent from the server, each of the at least one client device may locally perform a repeated message deleting process for deleting the repeated shared message. For example, provided that after a PC terminal logs into a communication account A last time, the server sends a shared message a1 with an unread mark A1 to the PC terminal, and the PC terminal outputs no read reminding information for the shared message a1 in the last login before the PC terminal logs out from the communication account A of a user A, or the PC terminal logs out from the communication account A of the user A with the shared informational being unread although the PC terminal outputs read reminding information for the shared informational in the last login, then the shared informational is still an unread message of the communication account A and is still in the unread information list corresponding to the communication account A after the PC terminal logs out from the communication account A last time. In the embodiment, after the PC terminal logs into the communication account A, the server reads the unread shared message a1 from the unread message list of the communication account A and sends the shared message a1 to the PC terminal. Since the shared message a1 has been received when the PC terminal logs into the communication account A last time, the PC terminal needs to perform the repeated message deleting process after receiving the shared message a1 this time, i.e., deleting the shared informational repeatedly received this time. The PC terminal then may output the read reminding information for the unread shared message a1 according to its message reminding mechanism, to remind the user A to read the shared message a1 in time.

S206 includes, if the server receives a read mark reported by any of the at least one client device after the shared message with the unread mark is read by the any of the at least one client device, the server performs synchronization, for the read mark, on each of the at least one client device except the client device reporting the read mark.

S206 in this embodiment may refer to S103 in the embodiment shown in FIG. 1, which is not described herein.

It should be noted that, in the embodiment, the read mark carries a second ID, and one second ID may be used to uniquely identify one shared message. For example, provided that after the PC terminal logs into a communication account A, the server sends total two shared messages with the unread marks, including a shared message a1 with an unread mark A1 and a shared message a2 with an unread mark A2, to the PC terminal, with the unread mark A1 carrying ID-a1 for uniquely identifying the shared message a1 and the unread mark A2 carrying ID-a2 for uniquely identifying the shared message a2. After the PC terminal locally performs the repeated message deleting process, the PC terminal outputs the read reminding information for the shared message a1 and the shared message a2. If the user A at the PC terminal reads the shared message a2, the PC terminal extracts ID-a2 as a second ID and generates a read mark b1 carrying ID-a2. The PC terminal reports the read mark b1 to the server, and the server performs synchronization for the read mark b1 among other client devices that log in to the communication account in S206, thus the server and other synchronized client devices know that the shared message a2 identified by ID-a2 has been read according to the ID-a2 carried in the read mark b1.

S207 includes, the server searches the unread message list corresponding to the first communication account for a shared message with the first ID carried in its unread mark being the same as the second ID carried in the read mark.

S208 includes, the server deletes the shared message, which is searched out, from the unread message list corresponding to the first communication account.

According to the examples described above, if the PC terminal reports the read mark b1 carrying ID-a2 to the sever, the server knows that the shared message a2 identified by ID-a2 has been read according to ID-a2 carried in the read mark b1 reported by the PC terminal. Then in steps S207 to S208, the server may find the unread mark A2 carrying ID-a2 in the unread message list corresponding to the communication account A, and further find the shared message a2; the server deletes the shared message a2, which is searched out, from the unread message list corresponding to the communication account A, and thus after the at least one client device logs into the communication account A again, the server does not send the shared message a2 to the client device that logs into the communication account A. By steps S207 to S208, the content included in the unread message list corresponding to the first communication account can be updated in time, thereby ensuring the accuracy of subsequent message synchronization.

In the embodiment of the disclosure, after the at least one client device logs into the first communication account, the server acquires the shared message with the unread mark corresponding to the first communication account and sends the shared message to the at least one client device, and message synchronization among the client devices that log into the same communication account can be ensured by sending the same unread message to the client devices by the server. In addition, if the server receives a read mark reported by any of the at least one client device after the shared message with the unread mark is read by any of the at least one client device, the server performs synchronization, for the read mark, on each of the at least one client device. The read mark can ensure the synchronization of the reading states of messages among the client devices, therefore, repeated unread reminding for the same message at the client devices is avoided to some extent, thereby improving the intelligence of the client device, and improving the reading experience for the user.

Figure 3:
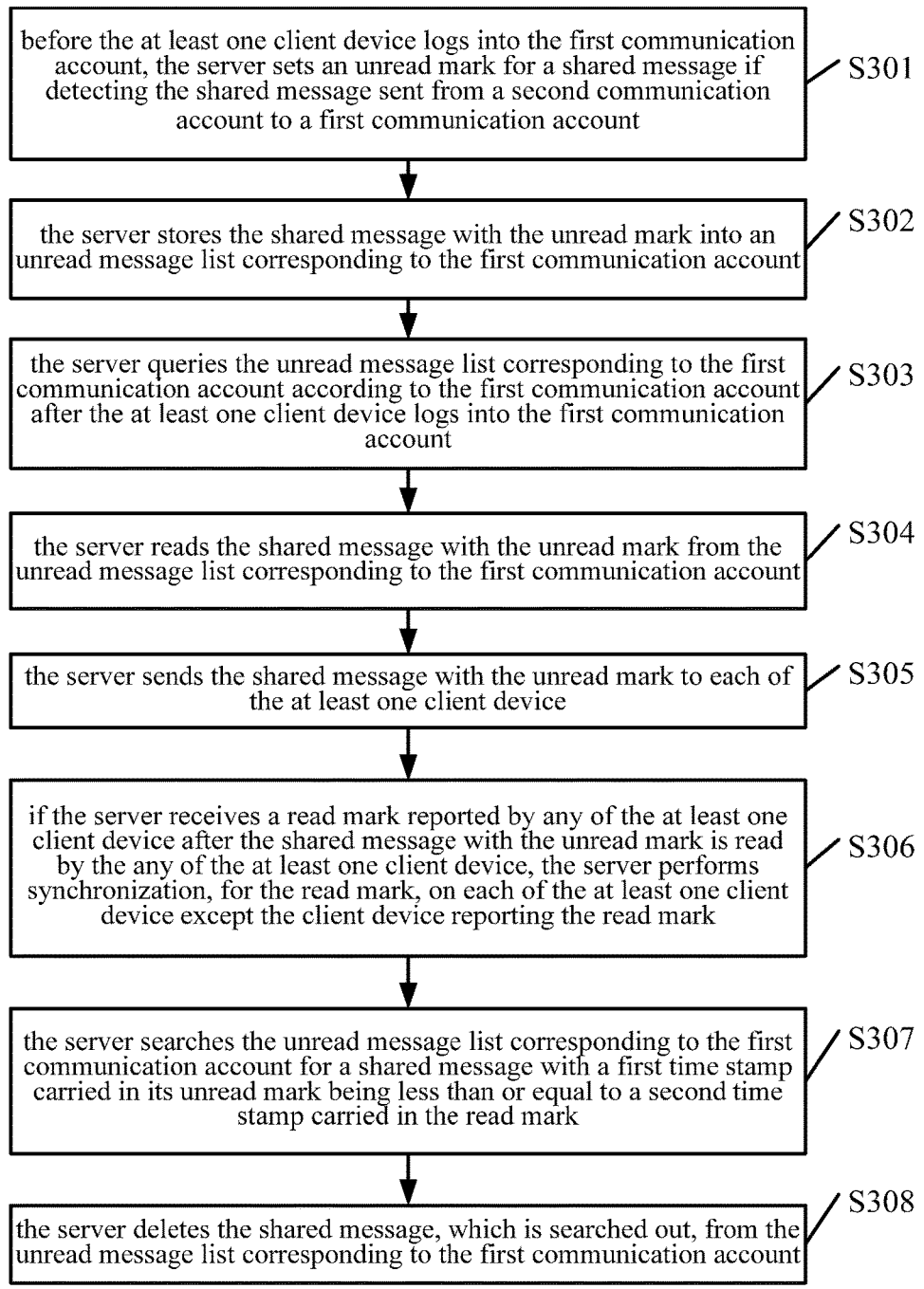
FIG. 3 is a flowchart of a message synchronizing method provided by an embodiment of the disclosure.

FIG. 3 is a flowchart of another message synchronizing method provided by an embodiment of the disclosure. In the embodiment, the process of the message synchronizing method is described from a point of the server side. The method may include the following steps S301 to S306.

S301 includes, before at least one client device logs into the first communication account, the server sets an unread mark for a shared message if detecting the shared message sent from a second communication account to a first communication account.

S302 includes, the server stores the shared message with the unread mark into an unread message list corresponding to the first communication account.

S303 includes, the sever queries the unread message list corresponding to the first communication account according to the first communication account, after the at least one client device logs into the first communication account.

S304 includes, the server reads the shared message with the unread mark from the unread message list corresponding to the first communication account.

S305 includes, the server sends the read shared message with the unread mark to each of the at least one client device.

S306 includes, if the server receives a read mark reported by any of the at least one client device after the shared message with the unread mark is read by the any of the at least one client device, the server performs synchronization, for the read mark, on each of the at least one client device except the client device reporting the read mark.

S301 to S306 in the embodiment may refer to S201 to S206 in the embodiment shows in FIG. 2, which is not described herein.

It should be noted that, in the embodiment, the unread mark carries a first ID and a first time stamp, one first ID is used to uniquely identify one shared message, and one first time stamp is used to indicate the time when one shared message is generated. For example, an unread mark C1 of a shared message c1 carries ID-c1 and a time stamp T-c1, where ID-c1 is used to uniquely identify the shared message c1 and the time stamp T-c1 indicates the time when the shared message c1 is generated. For another example, an unread mark C2 of a shared message c2 carries ID-c2 and a time stamp T-c2, where ID-a2 is used to uniquely identify the shared message c2, and the time stamp T-c2 indicates the time when the shared message c2 is generated. It should be understood that, the value of T-c1 may be equal to the value of T-c2, which shows that the shared message c1 and the shared message c2 are generated at the same time. Alternatively, the value of T-c1 may be not equal to the value of T-c2, which shows that the shared message c1 and the shared message c2 are generated at different time.

The read mark carries a second time stamp, and one second time stamp may be used to indicate the time when one shared message is generated. For example, provided that after a PC terminal logs into a communication account A, the server sends total two shared message with unread marks, including a shared message c1 with an unread mark C1 and a shared message c2 with an unread mark C2, to the PC terminal, with the unread mark C1 carrying ID-c1 and a time stamp T-c1, the unread mark C2 carrying ID-c2 and a time stamp T-c2, and the value of the T-c1 being less than the value of T-c2. After the PC terminal locally performs the repeated message deleting process, the PC terminal outputs read reminding information for the shared message c1 and the shared message c2. If a user C at the PC terminal reads the shared message c1 and the shared message c2, the PC terminal extracts T-c2 as a second time stamp, and generates a read mark d1 carrying T-c2. The PC terminal reports the read mark d1 to the server, and the server synchronizes the read mark d1 to other client devices except the PC terminal reporting the read mark d1 in S306. Therefore, the server and other synchronized client devices know that all the unread shared messages whose time stamp is less than or equal to T-c2 have been read according to T-c2 carried in the read mark d1. In this example, it is known that both the shared message c1 corresponding to the time stamp T-c1 and the shared message c2 corresponding to the time stamp T-c2 have been read.

S307 includes, the server searches the unread message list corresponding to the first communication account for a shared message with a first time stamp carried in its unread mark being less than or equal to a second time stamp carried in the read mark.

S308 includes, the server deletes the shared message, which is searched out, from the unread message list corresponding to the first communication account.

According to the examples described above, if the PC terminal reports the read mark d1 carrying the time stamp T-c2 to the server, the server knows that all the unread shared messages with a time stamp being less than or equal to T-c2 have been read according to the time stamp T-c2 carried in the read mark d1 reported by the PC terminal. Then in steps S307 to S308, the server may find the unread mark C1 carrying T-c1 that is less than T-c2 in the unread message list corresponding to the communication account C and further find the shared message c1, and may find the unread mark C2 carrying T-c2 and further find the shared message c2; then the server may delete the found shared message c1 and shared message c2 from the unread message list corresponding to the communication account C. Therefore, after at least one client device logs into the communication account A again, the server does not send the shared messages c1 and c2 to the client device that logs in to the communication account. By steps S307 to S308, the content included in the unread message list corresponding to the first communication account can be updated in time, thereby ensuring the accuracy of subsequent message synchronization.

In the embodiment of the disclosure, after the at least one client device logs into the first communication account, the server acquires the shared message with the unread mark corresponding to the first communication account and sends the shared message to each of the at least one client device, and the message synchronization among the client devices that log into the same communication account can be ensured by sending the same unread message to the client devices by the server. In addition, if the server receives a read mark reported by any of the at least one client device after the shared message with the unread mark is read by the any of the at least one client device, the server performs synchronization, for the read mark, on each of the at least one client device. The read mark can ensure the synchronization of the reading states of messages among the client devices, therefore, repeated unread reminding for the same message at the client devices is avoided to some extent, thereby improving the intelligence of the client device and improving the reading experience for the user.

Figure 4:
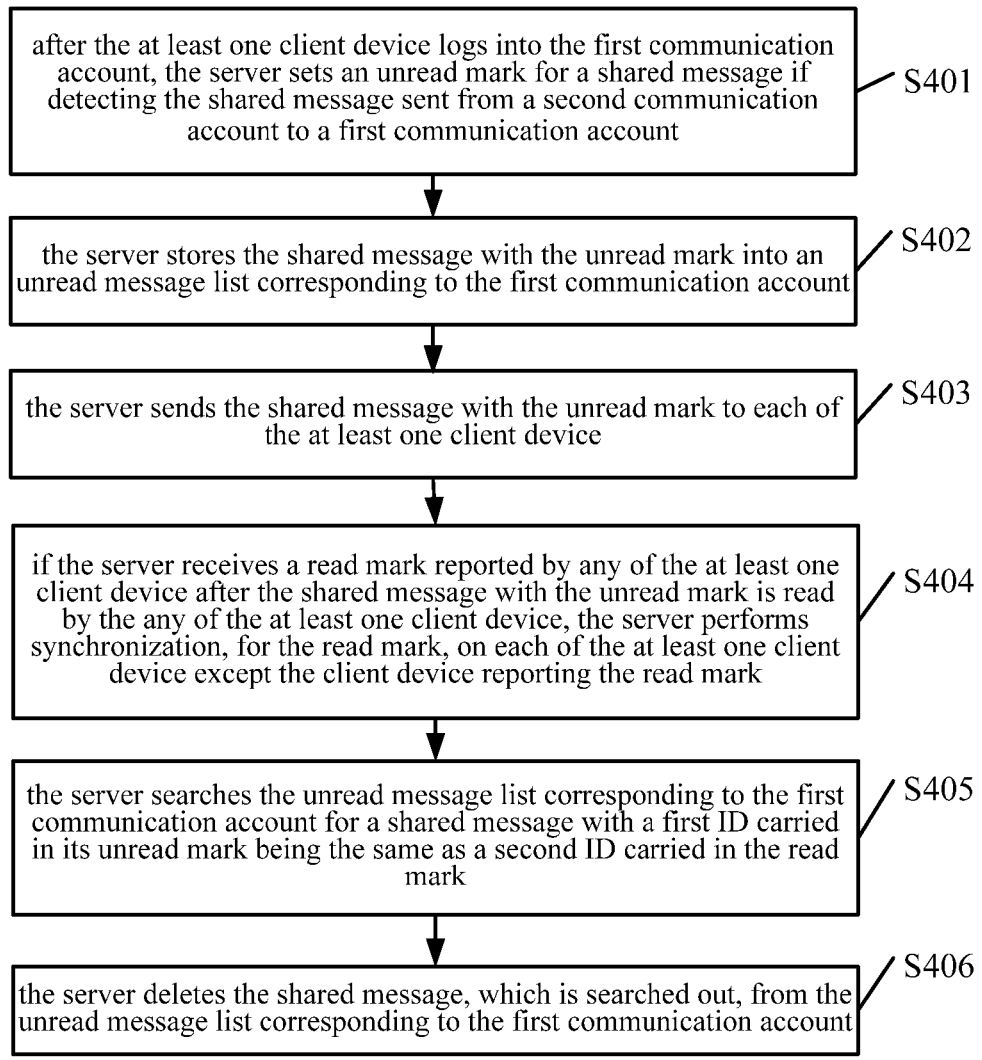
FIG. 4 is a flowchart of a message synchronizing method provided by an embodiment of the disclosure.

FIG. 4 is a flowchart of another message synchronizing method provided by an embodiment of the disclosure. In the embodiment, the process of the message synchronizing method is described from a point of the server side. The method may include the following steps S401 to S406.

S401 includes, after at least one client device logs into the first communication account, the server sets an unread mark for a shared message if detecting the shared message sent from a second communication account to a first communication account.

S402 includes, the server stores the shared message with the unread mark into an unread message list corresponding to the first communication account.

S403 includes, the server sends the shared message with the unread mark to each of the at least one client device.

In the embodiment, the sequence for performing steps S402 and S403 is not limited, that is, S403 may be performed before S402; or S402 and S403 may be performed simultaneously.

S404 includes, if the server receives a read mark reported by any of the at least one client device after the shared message with the unread mark is read by the any of the at least one client device, the server performs synchronization, for the read mark, on each of the at least one client device except the client device reporting the read mark.

S405 includes, the server searches an unread message list corresponding to the first communication account for a shared message with a first ID carried in its unread mark being the same as a second ID carried in the read mark.

S406 includes, the server deletes the shared message, which is searched out, from the unread message list corresponding to the first communication account.

Steps S404 to S406 in the embodiment may refer to steps S206 to S208 shown in FIG. 2, which is not described herein.

The difference between the embodiment shown in FIG. 4 and the embodiment shown in FIG. 2 is that: in the embodiment shown in FIG. 2, an unread message corresponding to the first communication account is generated before the at least one client device logs into the first communication account; the server reads the unread message corresponding to the first communication account from the unread message list corresponding to the first communication account, and synchronizes the unread message to the at least one client device that logs into the first communication account. In the embodiment shown in FIG. 4, an unread message corresponding to the first communication account is generated after the at least one client device logs into the first communication account, the server directly synchronizes the unread message to the at least one client device that logs into the first communication account after the server sets an unread mark for the unread message.

In the embodiment of the disclosure, after the at least one client device logs into the first communication account, the server acquires the shared message with the unread mark corresponding to the first communication account and sends the shared message to each of the at least one client device, and the message synchronization among the client devices that log into the same communication account can be ensured by sending the same unread message to the client devices by the server. In addition, if the server receives a read mark reported by any of the at least one client device after the shared message with the unread mark is read by the any of the at least one client device, the server performs synchronization, for the read mark, on each of the at least one client device. The read mark can ensure the synchronization of the reading states of messages among the client devices, therefore, repeated unread reminding for the same message at the client devices is avoided to some extent, thereby improving the intelligence of the client device, and improving the reading experience for the user.

Figure 5:
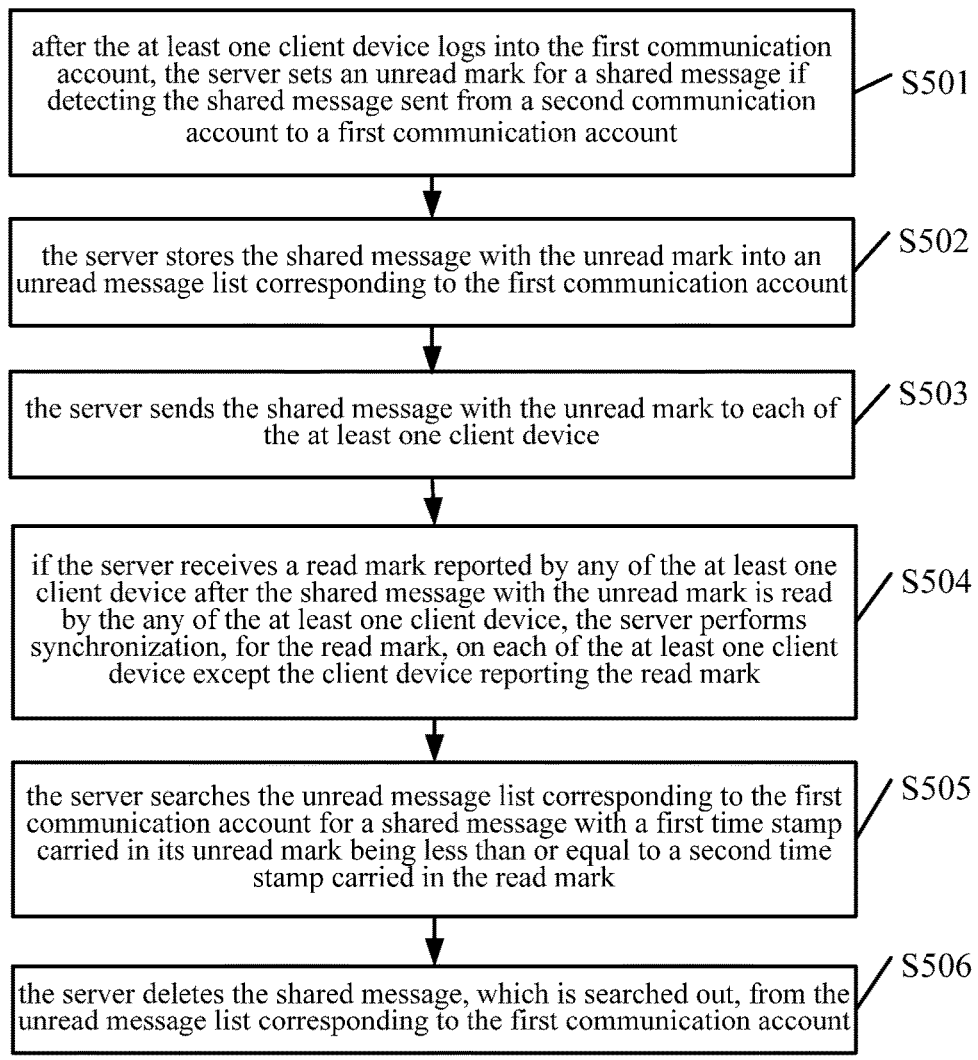
FIG. 5 is a flowchart of a message synchronizing method provided by an embodiment of the disclosure.

FIG. 5 is a flowchart of another message synchronizing method provided by an embodiment of the disclosure. In the embodiment, the process of the message synchronizing method is described from a point of the server side. The method may include the following steps S501 to S506.

S501 includes, after at least one client device logs into the first communication account, the server sets an unread mark for a shared message if detecting the shared message sent from a second communication account to a first communication account.

S502 includes, the server stores the shared message with the unread mark into an unread message list corresponding to the first communication account.

S503 includes, the server sends the shared message with the unread mark to each of the at least one client device.

In the embodiment, the sequence for performing steps S502 and S503 is not limited, that is, S503 may be performed before S502; or S502 and S503 may be performed simultaneously.

S504 includes, if the server receives a read mark reported by any of the at least one client device after the shared message with the unread mark is read by the any of the at least one client device, the server performs synchronization, for the read mark, on each of the at least one client device except the client device reporting the read mark.

S505 includes, the server searches the unread message list corresponding to the first communication account for a shared message with a first time stamp carried in its unread mark being less than or equal to a second time stamp carried in the read mark.

S506 includes, the server deletes the shared message, which is searched out, from the unread message list corresponding to the first communication account.

Steps S504 to S506 in the embodiment may refer to steps S306 to S308 shown in FIG. 3, which is not described herein.

The difference between the embodiment shown in FIG. 5 and the embodiment shown in FIG. 3 is that: in the embodiment shown in FIG. 3, an unread message corresponding to the first communication account is generated before the at least one client device logs into the first communication account; the server reads the unread message corresponding to the first communication account from the unread message list corresponding to the first communication account, and synchronizes the unread message to the at least one client device that logs into the first communication account. In the embodiment shown in FIG. 5, an unread message corresponding to the first communication account is generated after the at least one client device logs into the first communication account; the server directly synchronizes the unread message to the at least one client device that logs into the first communication account after the server sets an unread mark for the unread message.

In the embodiment of the disclosure, after the at least one client device logs into the first communication account, the server acquires the shared message with the unread mark corresponding to the first communication account and sends the shared message to each of the at least one client device, and the message synchronization among the client devices that log into the same communication account can be ensured by sending the same unread message to the client devices by the server. In addition, if the server receives a read mark reported by any of the at least one client device after the shared message with the unread mark is read by the any of the at least one client device, the server performs synchronization, for the read mark, on each of the at least one client device. The read mark can ensure the synchronization of the reading states of messages among the client devices, therefore, repeated unread reminding for the same message at the client devices is avoided to some extent, thereby improving the intelligence of the client device, and improving the reading experience for the user.

Figure 6:
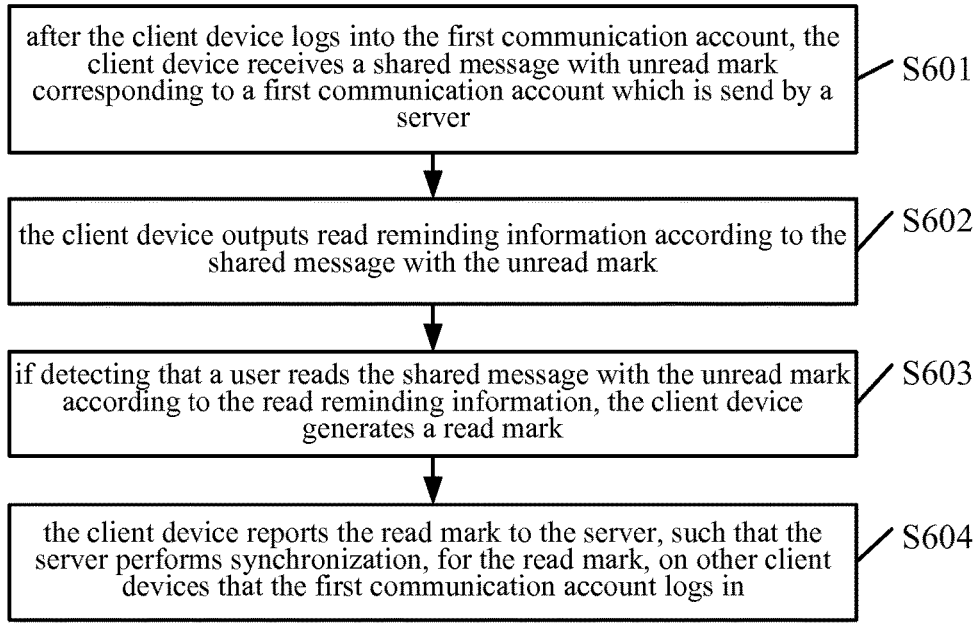
FIG. 6 is a flowchart of a message synchronizing method provided by an embodiment of the disclosure.

FIG. 6 is a flowchart of another message synchronizing method provided by an embodiment of the disclosure. In the embodiment, the process of the message synchronizing method is described from a point of the client device side. The client device in the embodiment may be any client device that logs into a communication account. The method may include the following steps S601 to S604.

S601 includes, after a client device logs into a first communication account, the client device receives a shared message with an unread mark corresponding to the first communication account which is sent by a server.

In the embodiment of the disclosure, the server manages all the shared messages corresponding to a same communication account. For example, after the PC terminal and the mobile phone terminal log into the first communication account of the instant messaging application, the server collectively manages all the instant messaging messages of the instant messaging applications used by a user of the communication account at the PC terminal and the mobile phone terminal, including all the read instant messaging messages and all the unread instant messaging messages corresponding to the communication account. In the step, after the client device logs into the first communication account, the client device receives the shared message with the unread mark corresponding to the first communication account which is sent by the server, i.e., receives an unread message corresponding to the first communication account sent by the server. In the step, messages among the client devices that log into the first communication account can be maintained to be consistent, thereby achieving message synchronization among the client devices that log into the same communication account.

S602 includes, the client device outputs read reminding information according to the shared message with the unread mark.

The read reminding information may be used to remind a user to read the shared message with the unread mark in time. For example, the read reminding information may be, for example, "an unread message for you, please check" or "three unread messages for you, please check in time". It is to be understood that, when multiple client devices log into a same communication account, the multiple client devices may provide read reminding according to their respective reminding mechanism. For example, if the unread message reminding mechanism of the mobile phone terminal of the user A is "remind every three days" and the unread message reminding mechanism of the PC terminal is "remind when logging in", the mobile phone terminal and the PC terminal provide read reminding information for the unread message according to the their respective reminding mechanism after the mobile phone terminal and the PC terminal log into the communication account A.

S603 includes, when the client device detects that a user reads the shared message with the unread mark according to the read reminding information, the client device generates a read mark.

S604 includes, the client device reports the read mark to the server, such that the server performs synchronization, for the read mark, on other client device that logs into the first communication account.

In steps S603 to S604, when the client device detects that the user reads the shared message with the unread mark according to the read reminding information, the client device generates a read mark, which shows that the shared message with the unread mark has been read, and the reading state of the shared message with the unread mark is changed from an unread state to a read state. Furthermore, the client device reports the read mark to the server, and the server may perform synchronization, for the received read mark, on other client devices that log into the first communication account, to inform other client device about that the reading state of the shared message with the unread mark is changed from an unread state to a read state and thus no read reminding is needed, thereby avoiding repeated reminding for the same unread message at the client devices, and improving user experience. In S604, the reading states of messages among the client devices that log into the first communication account can be maintained to be consistent, thereby achieving the synchronization of the reading states of messages among the client devices for the same communication account.

In the embodiment of the disclosure, after the at least one client device logs into the communication account, the client device receives the shared message with the unread mark corresponding to the communication account which is sent by the server, to ensure the message synchronization among the client devices that log into the communication account. In addition, the client device outputs read reminding information, generates a read mark and reports the read mark to the server when detecting that the shared message with the unread mark is read by the user, such that the server performs synchronization, for the read mark, on other client device that logs into the communication account, therefore, the synchronization of the reading states of messages among the client devices is ensured, and repeated reminding for the same message at the client devices is avoided to some extent, thereby improving the intelligence of the client device, and improving the reading experience for the user.

Figure 7:
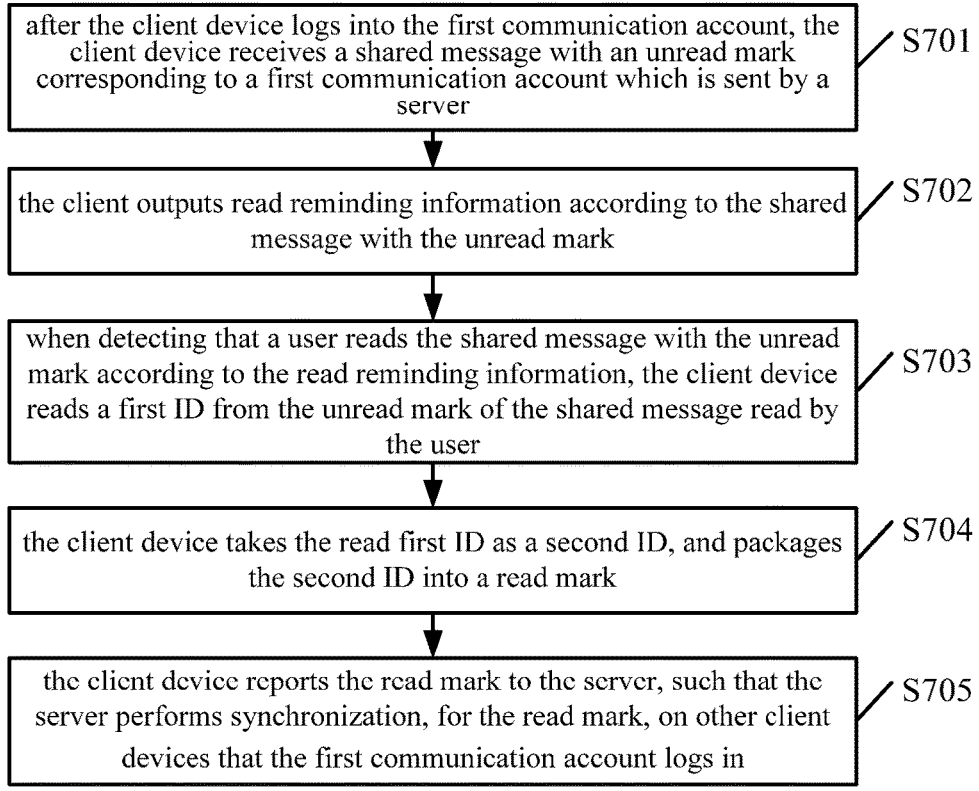
FIG. 7 is a flowchart of a message synchronizing method provided by an embodiment of the disclosure.

FIG. 7 is a flowchart of another message synchronizing method provided by an embodiment of the disclosure. In the embodiment, the process of the message synchronizing method is described from a point of the client device side. The client device in the embodiment may be any client device that logs into the communication account. The method may include the following steps S701 to S705.

S701 includes, after a client device logs into a first communication account, the client device receives a shared message with an unread mark corresponding to the communication account, which is sent by a server.

It should be noted that, after the client device receives the shared message with the unread mark which is sent by the server, the client device may locally perform a repeated message deleting process to delete the repeated shared message. For example, provided that after a PC terminal logs into a communication account A last time, the server sends a shared message a1 with an unread mark A1 to the PC terminal, and the PC terminal outputs no read reminding information for the shared message a1 in the last login before the PC terminal logs out from the communication account A of a user A, or the PC terminal logs out from the communication account A of the user A with the shared informational being unread although the PC terminal outputs read reminding information for the shared informational in the last login, then the shared informational is still an unread message of the communication account A and is still in the unread information list corresponding to the communication account A after the PC terminal logs out from the communication account A. In the embodiment, after the PC terminal logs into the communication account A, the server reads an unread shared message a1 from the unread message list of the communication account A and sends the shared message a1 to the PC terminal. Since the shared message a1 has been received when the PC terminal logs into the communication account A last time, the PC terminal needs to perform the repeated message deleting process after receiving the shared message a1 this time, i.e., deleting the shared informational repeatedly received this time. The PC terminal then may output the read reminding information for the unread shared message a1 according to its message reminding mechanism, to remind the user A to read the shared message a1 in time.

S702 includes, the client device outputs read reminding information according to the shared message with the unread mark.

In the embodiment, steps S701 to S702 may refer to steps S601 to S602 shown in FIG. 6, which is not described herein.

S703 includes, when the client device detects that a user reads the shared message with the unread mark according to the read reminding information, the client device reads a first ID from the unread mark of the shared message read by the user.

S704 includes, the client device takes the first ID as a second ID, and packages the second ID into a read mark.

In the embodiment, steps S703 to S704 may include the process in S603 in the embodiment shown in FIG. 6. In the embodiment, the unread mark carries a first ID, and one first ID may be used to uniquely identify one shared message. The read mark carries a second ID, and one second ID may be used to uniquely identify one shared message. Steps S703 to S704 are described by a specific example as follows. Provided that the PC terminal receives total two shared messages with unread marks sent by the server, including a shared message a1 with an unread mark A1 and a shared message a2 with an unread mark A2, with the unread mark A1 carrying ID-a1 used to uniquely identify the shared message a1 and the unread mark A2 carrying ID-a2 used to uniquely identify the shared message a2. The PC terminal outputs read reminding information for the shared message a1 and the shared message a2 after locally performing the repeated message deleting process. In steps S703 to S704, if the user A of the PC terminal only reads the shared message a2 according to the read reminding information, the PC terminal extracts ID-a2 as a second ID and generates a read mark b1 carrying ID-a2.

S705 includes, the client device reports the read mark to the server, such that the server performs synchronization, for the read mark, on other client device that logs into the first communication account.

The step may refer to S604 in the embodiment shown in FIG. 6. According to the examples described above, the PC terminal reports the read mark b1 to the server, such that the server synchronizes the read mark b1 to other client device that logs into the communication account A. Therefore, the server and other synchronized client device, according to ID-a2 carried in the read mark b1, know that the shared message a2 identified by ID-a2 has been read.

In the embodiment of the disclosure, after the at least one client device logs into the communication account, the client device receives the shared message with the unread mark corresponding to the communication account which is sent by the server, to ensure the message synchronization among the client devices that log into the communication account. In addition, the client device outputs the read reminding information, generates a read mark and reports the read mark to the server when detecting that the user reads the shared message, such that the server performs synchronization, for the read mark, on other client device that logs into the communication account, therefore, the synchronization of the reading states of messages among the client devices is ensured, repeated reminding for the same message at the client devices is avoided to some extent, thereby improving the intelligence of the client device, and improving the reading experience for the user.

Figure 8:
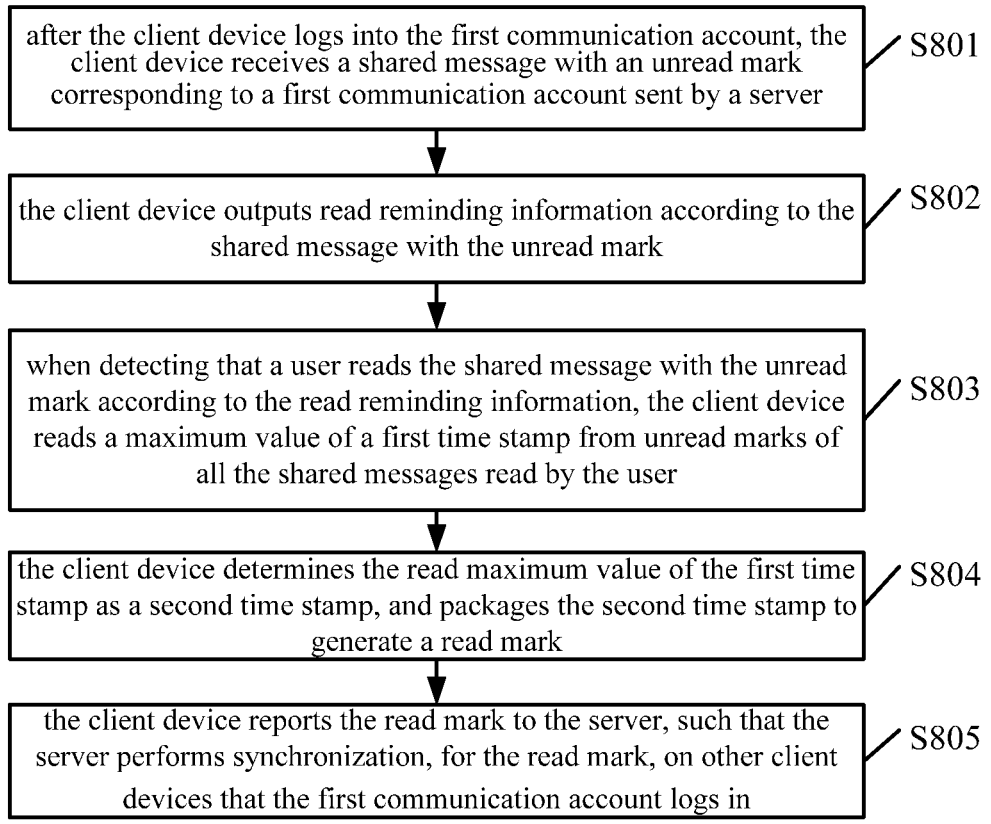
FIG. 8 is a flowchart of a message synchronizing method provided by an embodiment of the disclosure.

FIG. 8 is a flowchart of another message synchronizing method provided by an embodiment of the disclosure. In the embodiment, the process of the message synchronizing method is described from a point of the client device side. The client device in the embodiment may be any client device that logs into a communication account. The method may include the following steps S801 to S805.

S801 includes, after a client device logs into a first communication account, the client device receives a shared message with an unread mark corresponding to the first communication account, which is sent by a server.

S802 includes, the client device outputs read reminding information according to the shared message with the unread mark.

Steps S801 to S802 in the embodiment may refer to steps S701 to S702 in the embodiment shown in FIG. 7, which is not described herein.

S803 includes, when the client device detects that a user reads the shared message with the unread mark according to the read reminding information, the client device reads a maximum value of a first time stamp from unread marks of all the shared messages read by the user.

S804 includes, the client device determines the maximum value of the first time stamp as a value of a second time stamp, and packages the second time stamp into a read mark.

In the embodiment, steps S803 to S804 may include the process in S803 in the embodiment shown in FIG. 6. In the embodiment, the unread mark carries a first ID and a first time stamp, one first ID is used to uniquely identify one shared message, and one first time stamp is used to indicate the time when one shared message is generated. The read mark carries a second time stamp, and one second time stamp may be used to uniquely indicate the time when one shared message is generated. Steps S803 to S804 are described by a specific example as follows. After the PC client device logs into a communication account A, provided that the PC terminal receives total two shared messages with unread marks sent by the server, including a shared message c1 with an unread mark C1 and a shared message c2 with an unread mark C2, with the unread mark C1 carrying ID-c1 and T-c1, the unread mark C2 carrying ID-c2 and T-c2 and the value of T-c1 being less than the value of T-c2. The PC terminal outputs read reminding information for the shared information c1 and the shared information c2 after locally performing the repeated message deleting process. In steps S803 to S804, if a user C of the PC terminal reads the shared message c1 and the shared message c2, the PC terminal extracts T-c2 as a second time stamp and generates a read mark d1 carrying T-c2.

S805 includes, the client device reports the read mark to the server, such that the server performs synchronization, for the read mark, on other client device that logs into the first communication account.

This step may refer to S604 in the embodiment shown in FIG. 6. According to the examples described above, the PC terminal reports the read mark d1 to the server, such that the server synchronizes the read mark d1 to other client device that logs into the communication account A, and the server and other synchronized client device know that all the shared messages with the time stamp being less than or equal to T-c2 have been read, according to T-c2 carried in the read mark d1. In the example, it can be known that both the shared message c1 corresponding to the time stamp T-c1 and the shared message c2 corresponding to the time stamp T-c2 have been read.

In the embodiment of the disclosure, after the at least one client device logs into the communication account, the client device receives the shared message with the unread mark corresponding to the communication account, which is sent by the server, to ensure the message synchronization among the client device that logs into the communication account. In addition, the client device outputs read reminding information, generates a read mark and reports the read mark to the server when detecting that the user reads the shared message, such that the server performs synchronization, for the read mark, on other client device that logs into the communication account, therefore, the synchronization of the reading states of messages among the client devices is ensured, repeated reminding for the same message at the client devices is avoided to some extent, thereby improving the intelligence of the client device and improving the reading experience for the user.

The structure of the server provided by the embodiment of the disclosure is described in detail below in conjunction with FIG. 9 to FIG. 12. It should be noted that, the server described below may be applied to the methods described above.

Figure 9:
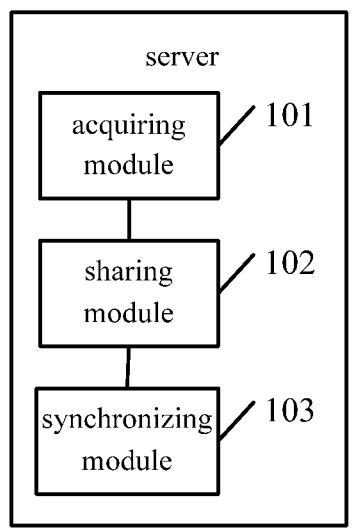
FIG. 9 is a schematic structural diagram of a server provided by an embodiment of the disclosure.

FIG. 9 is a schematic structural diagram of a server provided by an embodiment of the disclosure. The server may include an acquiring module 101, a sharing module 102 and a synchronizing module 103.

The acquiring module 101 is configured to acquire a shared message with an unread mark corresponding to a first communication account, after at least one client device logs into the first communication account.

If the client device logs into the first communication account of an instant messaging application, the first communication account is an instant messaging account of the instant messaging application. If the client device logs into the first communication account of a browser application, the first communication account is a communication account of the browser application. If the client device logs into the first communication account of a SNS (Social Networking Services) application, the first communication account is a SNS communication account of the SNS application. There may be only one client device that logs into a communication account, for example, the PC terminal logs into a communication account A of the instant messaging application, and a user A corresponding to the communication account A may communicate with other users by using the instant messaging application at the PC terminal. Alternatively, multiple client devices may log into a communication account, for example, both the PC terminal and the mobile phone terminal log into the communication account A of the instant messaging application, so the user A corresponding to the communication A may communicate with other users by using the instant messaging application at the PC terminal and the mobile phone terminal.

In the embodiment of the disclosure, a server manages all shared messages of a same communication account. For example, if both the PC terminal and the mobile phone terminal log into the first communication account of the instant messaging application, the server collectively manages all instant messaging messages of the instant messaging applications used by the user of the communication account at the PC terminal and the mobile phone terminal, including all the read instant messaging messages and all the unread instant messaging messages corresponding to the communication account. After the at least one client device logs into the first communication account, the acquiring module 101 acquires a shared message with an unread mark corresponding to the first communication account, that is, acquires an unread message corresponding to the first communication account.

The sharing module 102 is configured to send the shared message with the unread mark to each of the at least one client device.

The sharing module 102 sends the shared message with the unread mark to each of the at least one client device, such that any of the at least one client device may output read reminding information according to the shared message with the unread mark, to remind a user to read the shared message with the unread mark in time. The sharing module 102 may maintain the consistence of messages among the client devices that log into the first communication account, thereby achieving message synchronization among the client devices for the same communication account.

The synchronizing module 103 is configured to, when receiving a read mark reported by any of the at least one client device after the shared message with the unread mark is read by the any of the at least one client device, perform synchronization, for the read mark, on each of the at least one client device except the client device reporting the read mark.

Receiving a read mark reported by any of the at least one client device after the shared message with the unread mark is read by the any of the at least one client device shows that the shared message with the unread mark has been read at the client device reporting the read mark, and the reading state of the shared message with the unread mark is changed from an unread state to a read state. Furthermore, the synchronizing module 103 synchronizes the received read mark to each of the at least one client device except the client device reporting the read mark, to inform each of the at least one client device except the client device reporting the read mark about that the reading state of the shared message with the unread mark is changed from an unread state to a read state and no read reminding is needed, thereby avoiding repeated reminding for the same unread message at the client devices, and improving user experience. In this step, the reading states of the messages among the client devices that log into the first communication account can be maintained to be consistent, thereby achieving the synchronization of the reading states of the messages among the client devices for the same communication account.

In the embodiment of the disclosure, after the at least one client device logs into the first communication account, the server acquires the shared message with the unread mark corresponding to the first communication account and sends the shared message to each of the at least one terminal, and message synchronization among the client devices that log into the same communication account can be ensured by sending the same unread message to the client devices by the server. In addition, if the server receives a read mark reported by any of the at least one client device after the shared message with the unread mark is read by the any of the at least on client device, the server performs synchronization, for the read mark, on each of the at least one client device, and the read mark can ensure the synchronization of the reading states of messages among the client devices, therefore, repeated unread reminding for the same message at the client devices is avoided to some extent, thereby improving the intelligence of the client device, and improving the reading experience for the user.

Figure 10:
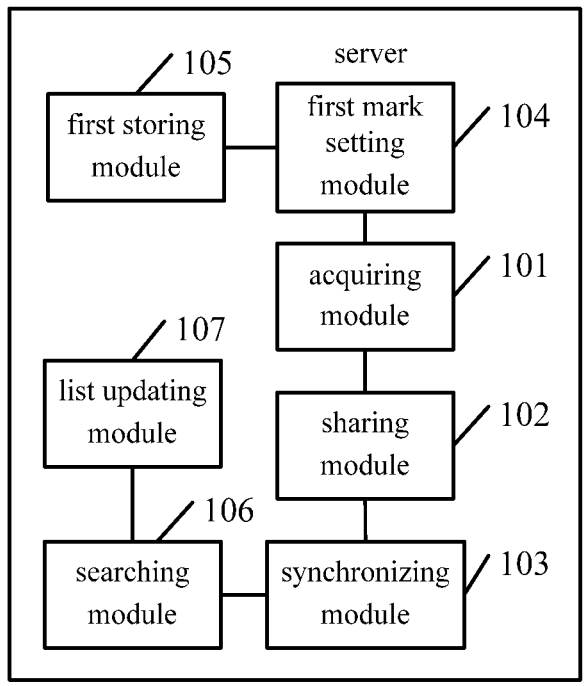
FIG. 10 is a schematic structural diagram of a server provided by an embodiment of the disclosure.

FIG. 10 is a schematic structural diagram of another server provided by an embodiment of the disclosure. The server may include an acquiring module 101, a sharing module 102, a synchronizing module 103, a first mark setting module 104, a storing module 105, a searching module 106 and a list updating module 107. The structures of the acquiring module 101, the sharing module 102 and the synchronizing module 103 may refer to the related description of the embodiment shown in FIG. 9, which is not described herein.

The first mark setting module 104 is configured to, before at least one client device logs into the first communication account, set an unread mark for a shared message if detecting the shared message sent from a second communication account to the first communication account.

If the client device logs into the first communication account of an instant messaging application, the first communication account is an instant messaging account of the instant messaging application, and the second communication account is an instant messaging account of the instant messaging application except the first communication account. If the client device logs into the first communication account of a browser application, the first communication account is a communication account of the browser application and the second communication account is a communication account of the browser application except the first communication account. If the client device logs into the first communication account of a SNS application, the first communication account is a SNS communication account of the SNS application and the second communication account is a SNS communication account of the SNS application except the first communication account.

The unread mark carries a first ID (IDentity), and one first ID may be used to uniquely identify one shared message. The first mark setting module 104 sets an unread mark for the shared message sent from the second communication account shows that the shared message is an unread message corresponding to the first communication account. For example, before any client device logs into a communication account A of an instant messaging application, if the first mark setting module 104 detects a shared message a1 which is sent from a user B corresponding to a communication account B to the communication account A via any terminal (for example, a PC, a mobile phone or a tablet computer), the first mark setting module 104 assigns a first ID to the shared message a1 (for example, indicated by ID-a1), sets an unread mark A1 for the shared message a1, and includes ID-a1 in the unread mark A1, thus the shared message a1 is an unread message corresponding to the communication account A.

The first storing module 105 stores the shared message with the unread mark set by the first mark setting module into an unread message list corresponding to the first communication account.

In the embodiment of the disclosure, the first storing module 105 may store the unread message corresponding to the communication account in the form of a list, and forms an unread message list corresponding to the communication account. According to the examples described above, provided that the communication A has two unread messages totally, including a shared message a1 with an unread mark A1 and a shared message a2 with an unread mark A2, the first storing module 105 stores the two unread messages into the unread message list corresponding to the communication account A.

The searching module 106 is configured to, after receiving a read mark reported by any of the at least one client device after the shared message with the unread mark is read by the any of the at least one client device, search the unread message list corresponding to the first communication account for a shared message with the first ID carried in its unread mark being the same as the second ID carried in the read mark, or search the unread message list corresponding to the first communication account for a shared message with a first time stamp carried in its unread mark being less than or equal to a second time stamp carried in the read mark.

The list updating module 107 is configured to delete the shared message, which is searched out, from the unread message list corresponding to the first communication account.

The list updating module 108 may update the content included in the unread message list corresponding to the first communication account in time, to ensure the accuracy of subsequent message synchronization.

In the embodiment of the disclosure, after the at least one client device logs into the first communication account, the server acquires the shared message with the unread mark corresponding to the first communication account and sends the shared message to each of the at least one terminal, and message synchronization among client devices that log into the same communication account can be ensured by sending the same unread message to the client devices by the server. In addition, if the server receives a read mark reported by any of the at least one client device after the shared message with the unread mark is read by the any of the at least on client device, the server performs synchronization, for the read mark, on each of the at least one client device, and the read mark can ensure the synchronization of the reading states of messages among the client devices, therefore, repeated unread reminding for the same message at the client devices is avoided to some extent, thereby improving the intelligence of the client device, and improving the reading experience for the user.

Figure 11:
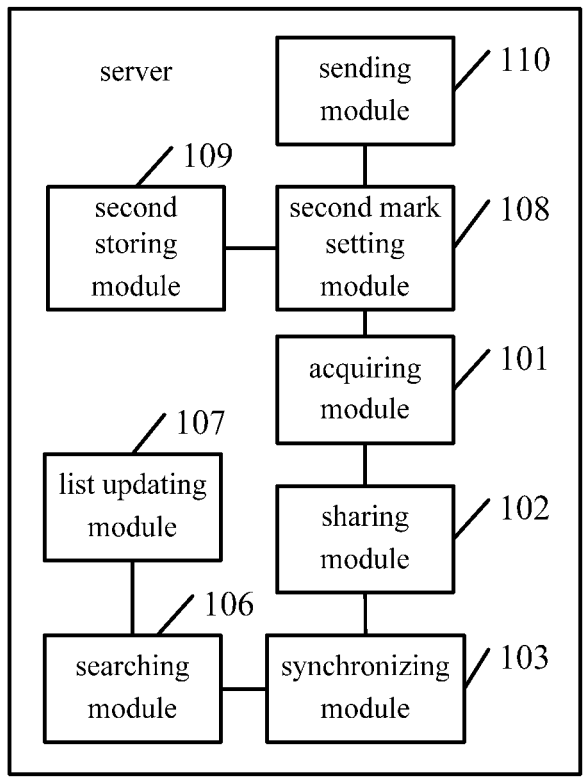
FIG. 11 is a schematic structural diagram of a server provided by an embodiment of the disclosure.

FIG. 11 is a schematic structural diagram of another server provided by an embodiment of the disclosure. The server may include an acquiring module 101, a sharing module 102, a synchronizing module 103, a second mark setting module 108, a second storing module 109, a sending module 110, a searching module 106 and a list updating module 107. The structures of the acquiring module 101, the sharing module 102, the synchronizing module 103, the searching module 106 and the list updating module 107 may refer to the related description of the embodiment shown in FIG. 10, which is not described herein.

The second mark setting module 108 is configured to, after at least one client device logs into the first communication account, set an unread mark for a shared message if detecting the shared message sent from a second communication account to the first communication account.

The second storing module 109 is configured to store the shared message with the unread mark set by the second mark setting module into an unread message list corresponding to the first communication account.

The sending module 110 is configured to send the shared message with the unread mark set by the second mark setting module to each of the at least one client device.

It should be noted that, after each of the at least one client device receives the shared message sent by the server, the each of the at least one client device may locally perform the repeated message deleting process, and outputs, according to its message reminding mechanism, read reminding information for the shared message with the unread mark after the repeated message deleting process.

In the embodiment of the disclosure, after the at least one client device logs into the first communication account, the server acquires the shared message with the unread mark corresponding to the first communication account and sends the shared message to each of the at least one terminal, and message synchronization among the client devices that log into the same communication account can be ensured by sending the same unread message to the client devices by the server. In addition, if the server receives a read mark reported by any of the at least one client device after the shared message with the unread mark is read by the any of the at least on client device, the server performs synchronization, for the read mark, on each of the at least one client device, and the read mark can ensure the synchronization of the reading states of messages among the client devices, therefore, repeated unread reminding for the same message at the client devices is avoided to some extent, thereby improving the intelligence of the client device, and improving the reading experience for the user.

FIG. 12 is a schematic structural diagram of an acquiring module of a server provided by an embodiment of the disclosure. The acquiring module 101 may include a querying unit 1101 and a reading unit 1102.

The querying unit 1101 is configured to query the unread message list corresponding to the first communication account according to the communication account, after the at least one client device logs into the first communication account.

The reading unit 1102 is configured to read a shared message with an unread mark from the unread message list corresponding to the first communication account.

The server may store all the unread messages corresponding to the first communication account in the form of an unread message list, so after the at least one client device logs into the first communication account, the querying unit 1101 may query the unread message list corresponding to the first communication account according to the first communication account, and the reading unit 1102 reads the shared message with the unread mark from the unread message list.

It should be noted that, the structure and the function of the server in the embodiments shown in FIG. 9 to FIG. 12 may be implemented by referring to the method embodiments shown in FIG. 1 to FIG. 5, the specific implementation may refer to the related description of the method embodiments described above, which is not described herein.

In the embodiment of the disclosure, after the at least one client device logs into the first communication account, the server acquires the shared message with the unread mark corresponding to the first communication account and sends the shared message to each of the at least one terminal, and message synchronization among the client devices that log into the same communication account can be ensured by sending the same unread message to the client devices by the server. In addition, if the server receives a read mark reported by any of the at least one client device after the shared message with the unread mark is read by the any of the at least on client device, the server performs synchronization, for the read mark, on each of the at least one client device, and the read mark can ensure the synchronization of the reading states of messages among the client devices, therefore, repeated unread reminding for the same message at the client devices is avoided to some extent, thereby improving the intelligence of the client device, and improving the reading experience for the user.

The structure of the client device provided by an embodiment of the disclosure is described in detail below in conjunction with FIG. 13 to FIG. 15. It should be noted that, the client device described below may be any client device that logs into a communication terminal, and the client device described below may be applied to the method described above.

Figure 13:
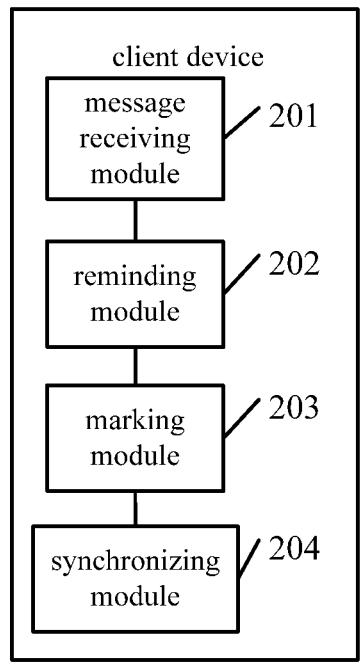
FIG. 13 is a schematic structural diagram of a client device provided by an embodiment of the disclosure.

FIG. 13 is a schematic structural diagram of a client device provided by an embodiment of the disclosure. The client device may include a message receiving module 201, a reminding module 202, a marking module 203 and a synchronizing module 204.

The message receiving module 201 is configured to receive a shared message with an unread mark corresponding to a first communication account, which is sent by a server, after the client device logs into the first communication account.

In the embodiment of the disclosure, a server manages all shared messages of a same communication account. For example, if both the PC terminal and the mobile phone terminal log into the first communication account of the instant messaging application, the server collectively manages all instant messaging messages of the instant messaging applications used by the user of the communication account at the PC terminal and the mobile phone terminal, including all the read instant messaging messages and all the unread instant messaging messages corresponding to the communication account. After the client device logs into the first communication account, the message receiving module 201 of the client device receives the shared message with the unread mark corresponding to the first communication account which is sent by the server, i.e., receives an unread message corresponding to the first communication account sent by the sever. The message receiving module 201 may maintain the consistence of messages among the client devices that log into the first communication account, thereby achieving message synchronization among the client devices that log into the same communication account.

The reminding module 202 is configured to output read reminding information according to the shared message with the unread mark.

The read reminding information may be used to remind a user to read the shared message with the unread mark in time. For example, the read reminding information may be "one unread message for you, please check" or "three unread messages for you, please check in time". It should be understood that, when multiple client devices log into a same communication account, the client devices may provide read reminding according to their respective reminding mechanism. For example, if the unread message reminding mechanism of the mobile phone terminal of the user A is "reminding every three days", and the unread reminding mechanism of the PC terminal is "reminding when logging in", the mobile phone terminal and the PC terminal provide read reminding for the unread message according to their respective reminding mechanism after the mobile phone terminal and the PC terminal log into the communication account A.

The marking module 203 is configured to generate a read mark when detecting that the user reads the shared message with the unread mark according to the read reminding information.

When detecting that the user reads the shared message with the unread mark according to the read reminding information, the marking module 203 generates a read mark which shows that the shared message with the unread mark has been read, and the reading state of the shared message with the unread mark is changed from an unread state to a read state.

The synchronizing module 204 is configured to report the read mark to the server, such that the server performs synchronization, for the read mark, on other client device that logs into the first communication account.

The synchronizing module 204 reports the read mark to the server, and the server may perform synchronization, for the received read mark, on other client device that logs into the first communication account, to inform other client device about that the reading state of the shared message with the unread mark is changed from an unread state to a read state and thus no read reminding is needed, thereby avoiding repeated reminding for the same unread message at the client devices, and improving the user experience. The synchronizing module 204 can maintain the consistence of the reading states of messages among the client devices that log into the first communication account, thereby achieving the synchronization of the reading states of messages among the client devices for the same communication account.

In the embodiment of the disclosure, after the at least one client device logs into the first communication account, the client device receives the shared message with the unread mark corresponding to the first communication account which is sent by the server, to ensure messages synchronization among the client devices that log into the first communication account. In addition, the client device outputs the read reminding information, generates a read mark and reports the read mark to the server when detecting that the user reads the shared message, such that the server performs synchronization, for the read mark, on other client device that logs into the first communication account, therefore, the synchronization of the reading states of messages among the client devices is ensured, repeated reminding for the same message at the client devices is avoided to some extent, thereby improving the intelligence of the client device and the reading experience for the user.

Figure 14:
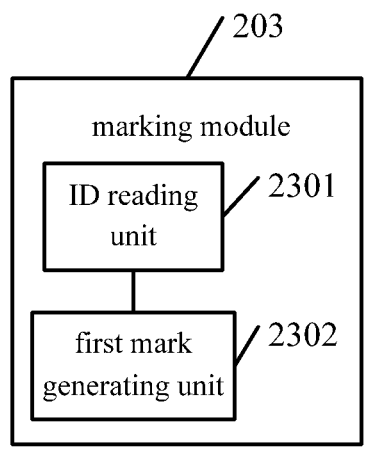
FIG. 14 is a schematic structural diagram of a marking module of a client device according to an embodiment of the disclosure.

FIG. 14 is a schematic structural diagram of a marking module of a client device according to an embodiment of the disclosure. The marking module 203 may include an ID reading unit 2301 and a first mark generating unit 2302.

The ID reading unit 2301 is configured to, when detecting that a user reads a shared message with an unread mark according to the read reminding information, read a first ID from the unread mark of the shared message read by the user.

The first mark generating unit 2302 is configured to take the first ID as a second ID, and package the second ID into a read mark.

In the embodiment, the unread mark carries the first ID, and one first ID may be used to uniquely identify one shared message. The read mark carries the second ID, and one second ID may be used to uniquely identify one shared message. It is illustrated by a specific example as follows. Provided that a PC terminal receives total two shared messages with unread marks sent by a server, including a shared message a1 with an unread mark A1 and a shared message a2 with an unread mark A2, with the unread mark A1 carrying ID-a1 for uniquely identifying the shared message a1 and the unread mark A2 carrying ID-a2 for uniquely identifying the shared message a2. The PC terminal outputs read reminding information for the shared message a1 and the shared message a2 after locally performing the repeated message deleting process. If a user A of the PC terminal only reads the shared message a2 according to the read reminding information, the ID reading unit 2301 of the PC terminal extracts ID-a2. The first mark generating unit 2302 of the PC terminal takes ID-a2 as the second ID, and generates a read mark b1 carrying ID-a2.

In the embodiment of the disclosure, after the at least one client device logs into the first communication account, the client device receives the shared message with the unread mark corresponding to the first communication account which is sent by the server, to ensure message synchronization among the client devices that log into the first communication account. In addition, the client device outputs read reminding information, generates a read mark and reports the read mark to the server when detecting that the user reads the shared message, such that the server performs synchronization, for the read mark, on other client devices that log into the first communication account, therefore, the synchronization of the reading states of messages among the client devices is ensured, repeated reminding for the same message at the client devices is avoided to some extent, thereby improving the intelligence of the client device and improving the reading experience for the user.

Figure 15:
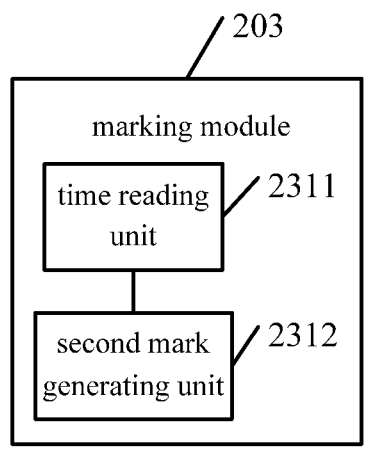
FIG. 15 is a schematic structural diagram of a marking module of a client device according to an embodiment of the disclosure.

FIG. 15 is a schematic structural diagram of another marking module of a client device provided by an embodiment of the disclosure. The marking module 203 may include a time reading unit 2311 and a second mark generating unit 2312.

The time reading unit 2311 is configured to, when detecting that the user reads the shared message with the unread mark according to the read reminding information, read a maximum value of a first time stamp from unread marks of all the shared messages read by user.

The second mark generating unit 2312 is configured to determine the maximum value of the first time stamp as a value of a second time stamp, and package the second time stamp into a read mark.

In the embodiment, the unread mark carries a first ID and a first time stamp, one first ID may be used to uniquely identify one shared message, and one first time stamp is used to indicate the time when one shared message is generated. The read mark carries a second time stamp, and one second time stamp may be used to indicate the time when one shared message is generated. It is illustrated by a specific example as follows. After a PC terminal logs into a communication account A, provided that the PC terminal receives total two shared messages with unread marks sent by the server, including a shared message c1 with an unread mark C1 and a shared message c2 with an unread mark C2, with the unread mark C1 carrying ID-c1 and T-c1, the unread mark C2 carrying ID-c2 and T-c2, and the value of T-c1 being less than the value of T-c2. The PC terminal outputs read reminding information for the shared message c1 and the shared message c2 after locally performing the repeated message deleting process. If a user C of the PC terminal reads the shared message c1 and the shared message c2, the time extracting unit 2311 of the PC terminal extracts T-c2. The second mark generating unit 2312 of the PC terminal takes T-c2 as a second time stamp, and generates a read mark d1 carrying T-c2.

It should be noted that, the structure and the function of the client device shown in FIG. 13 to FIG. 15 may be implemented by referring to the method embodiments shown in FIG. 6 to FIG. 8, and the specific implementation may refer to the related description of the method embodiments described above, which is not described herein.

In the embodiment of the disclosure, after the at least one client device logs into the first communication account, the client device receives the shared message with the unread mark corresponding to the first communication account which is sent by the server, to ensure the message synchronization among the client devices that log into the first communication account. In addition, the client device outputs the read reminding information, generates a read mark and reports the read mark to the server when detecting that the user reads the shared message, such that the server performs synchronization, for the read mark, on other client device that logs into the first communication account, therefore, the synchronization of the reading states of messages among the client devices is ensured, repeated reminding for the same message at the client devices is avoided to some extent, thereby improving the intelligence of the client device and improving the reading experience for the user.

A message synchronizing system is provided by an embodiment of the disclosure. The system may include a server in the embodiments shown in FIG. 9 to FIG. 12, and at least one client device in the embodiments shown in FIG. 13 to FIG. 15. The structures of the server and the client device may refer to the related description of the embodiments described above, which are not described herein.

In the embodiment of the disclosure, after the at least one client device logs into the first communication account, the server acquires the shared message with the unread mark corresponding to the first communication account and sends the shared message to each of the at least one client device, and message synchronization among the client devices that log into the same communication account can be ensured by sending the same unread message to the client devices by the server. In addition, if the server receives a read mark reported by any of the at least one client device after the shared message with the unread mark is read by the any of the at least one client device, the server performs synchronization, for the read mark, on each of the at least one client device. The read mark can ensure the synchronization of the reading states of messages among the client devices, which avoids repeated unread reminding for the same message at the client devices to some extent, thereby improving the intelligence of the client device and improving the reading experience for the user.

Those skilled in the art may understand that all or some of the processes in the embodiments of the methods described above can be implemented by related hardware instructed by a computer program, and the program may be stored in a computer readable storing medium. The processes of the embodiments of the methods described above may be implemented by executing the program. The storing medium may be, for example, a magnetic disc, an optical disc, a ROM (Read-Only Memory) and a RAM (Random Access Memory).

The disclosed are only preferred embodiments of the disclosure and are not intended to limit the scope of protection of the disclosure. Therefore, the equivalent variations made according to the claims of the disclosure still fall within the scope of protection of the disclosure.

The invention claimed is:

1. A method, performed by a server, for synchronizing messages between a plurality of client devices sharing a first communication account, comprising:
    detecting a receipt, by the first communication account, of a shared message from a second communication account;
    marking the shared message with an unread mark and storing the shared message comprising the unread mark into an unread message list corresponding to the first communication account;
    acquiring the shared message comprising the unread mark from the unread message list and sending the shared message comprising the unread mark to each of the plurality of client devices, when the first of the plurality of client devices logs into the first communication account;
    when the shared message is read by one of the plurality of client devices for a first time,
        receiving a read mark reported by the client device that first reads the shared message; and
        upon receipt of the read mark,
            informing each of the plurality of client devices except the client device reporting the read mark that a reading state of the shared message with the unread mark is changed from an unread state to a read state;
            finding, from the unread message list, another shared message comprising an unread mark carrying a first time stamp being less than or equal to a second time stamp carried in the read mark; and deleting the shared message and the other shared message from the unread message list.

2. The method according to claim 1, further comprising: detecting that the first communication account received the shared message from a second communication account before storing the shared message comprising the unread mark into an unread message list corresponding to the first communication account.

3. The method according to claim 2, wherein the acquiring of the shared message comprising the unread mark comprises:
querying the unread message list corresponding to the first communication account, according to the first communication account; and
reading the shared message comprising the unread mark from the unread message list corresponding to the first communication account.

4. The method according to claim 3, wherein after receiving the read mark and before deleting the shared message, the method further comprises finding, from the unread message list, the shared message, wherein the shared message comprises the unread mark carrying a first identity (ID) being the same as a second ID carried in the read mark.

5. The method according to claim 1, wherein the acquiring of the shared message comprising the unread mark comprises:
querying the unread message list corresponding to the first communication account, according to the first communication account; and
reading the shared message comprising the unread mark from the unread message list corresponding to the first communication account.

6. A method, performed by one of a plurality of client devices sharing a first communication account and in communication with a server, for synchronizing messages between the plurality of client devices, comprising:
receiving from the server a shared message comprising an unread mark corresponding to a first communication account after the client device logs into the first communication account, wherein the shared message is received from a second communication account, marked with the unread mark and stored into an unread message list corresponding to the first communication account, by the server;
outputting read reminding information according to the shared message comprising the unread mark;
determining a maximum time stamp from first time stamps of unread marks of all shared messages read by a user, when detecting that the user reads the shared message comprising the unread mark according to the read reminding information;
generating a read mark when detecting that a user reads the shared message comprising the unread mark according to the read reminding information, wherein the read mark comprises the maximum time stamp and the unread mark comprises a first ID and a first time stamp; and
reporting to the server the read mark, which renders the server to inform at least one other client device of the plurality of client devices that logs into the first communication account that a reading state of the shared message with the unread mark is changed from an unread state to a read state upon receipt of the read mark, and renders the server to delete the shared message read by the one of the plurality of client devices from the unread message list.

7. The method according to claim 6, further comprising:
reading a first Identity (ID) carried by the unread mark comprised in the shared message when detecting that the user reads the shared message according to the read reminding information; and
including the first ID into the read mark.

8. A server in communication with a plurality of client devices, comprising:
a non-transitory computer medium comprising a program; and
a processor in communication with the non-transitory computer medium configured to execute the program to:
detect a receipt, by a first communication account, of a shared message from a second communication account;
mark the shared message with an unread mark and store the shared message comprising the unread mark into an unread message list corresponding to the first communication account;
acquire the shared message comprising the unread mark from the unread message list and send the shared message comprising the unread mark to each of the plurality of client devices, when the first of the plurality of client devices logs into the first communication account;
when the shared message is read by one of the plurality of client devices for a first time,
receive a read mark reported by the client device that first read the shared message; and
upon receipt of the read mark:
inform each of the plurality of client devices except the client device reporting the read mark that a reading state of the shared message with the unread mark is changed from an unread state to a read state;
finding, from the unread message list, another shared message comprising an unread mark carrying a first time stamp being less than or equal to a second time stamp carried in the read mark; and
delete the shared message and the other shared message from the unread message list.

9. The server according to claim 8, wherein the processor is further configured to execute the program to:
detect that the first communication account received a shared message from a second communication account before storing the shared message comprising the unread mark into an unread message list corresponding to the first communication account.

10. The server according to claim 9, wherein to acquire the shared message the processor is further configured to execute the program to:
query the unread message list corresponding to the first communication account according to the first communication account, after the at least one client device logs into the first communication account; and
read the shared message comprising the unread mark from the unread message list corresponding to the first communication account.

11. The server according to claim 10, wherein after receiving the read mark and before deleting the shared message, the processor is further configured to execute the program to find, from the unread message list, the shared message, wherein the shared message comprises the unread mark carrying a first identity (ID) being the same as a second ID carried in the read mark.

12. The server according to claim 8, wherein to acquire the shared message the processor is further configured to execute the program to:
query the unread message list corresponding to the first communication account according to the first communication account, after the at least one client device logs into the first communication account; and
read the shared message comprising the unread mark from the unread message list corresponding to the first communication account.

13. A client device in communication with a server, comprising:
a non-transitory computer medium comprising a program; and
a processor in communication with the non-transitory computer medium configured to execute the program to:
receive from the server a shared message comprising an unread mark corresponding to a first communication account, after the client device logs into the first communication account, wherein the shared message is received from a second communication account, marked with the unread mark and stored into an unread message list corresponding to the first communication account, by the server;
output read reminding information according to the shared message comprising the unread mark;
determine a maximum time stamp from first time stamps of unread marks of all shared messages read by a user, when detecting that the user reads the shared message comprising the unread mark according to the read reminding information;
generate a read mark when detecting that a user reads the shared message comprising the unread mark according to the read reminding information, wherein the read mark comprises the maximum time stamp and the unread mark comprises a first ID and a first time stamp; and
report to the server the read mark, which renders the server to inform at least one other client device of a plurality of client devices that logs into the first communication account that a reading state of the shared message with the unread mark is changed from an unread state to a read state upon receipt of the read mark, and renders the server to delete the shared message read by the one of the plurality of client devices from the unread message list.

14. The client device according to claim 13, the processor is further configured to execute the program to:
read a first identity (ID) carried by the unread mark comprised in the shared message when detecting that the user reads the shared message according to the read reminding information; and
include the first ID into the read mark.

15. A message synchronizing system, comprising:
a server in communication with a plurality of client devices sharing a first communication account,
wherein the server is configured to:
detect a receipt, by the first communication account, of a shared message from a second communication account;
mark the shared message with an unread mark and store the shared message comprising the unread mark into an unread message list corresponding to the first communication account;
acquire the shared message comprising the unread mark from the unread message list and sending the shared message comprising the unread mark to each of the plurality of client devices, when the first of the plurality of client devices logs into the first communication account;
when the shared message is first read by a client device of the plurality of client devices,
receive a read mark reported by the client device that first read the shared message; and
upon receipt of the read mark:
inform each of the plurality of client devices except the client device reporting the read mark that a reading state of the shared message with the unread mark is changed from an unread state to a read state; finding, from the unread message list, another shared message comprising an unread mark carrying a first time stamp being less than or equal to a second time stamp carried in the read mark; and
delete the shared message and the other shared message from the unread message list; and
the client device in communication with the server,
wherein a client device of the plurality of client devices is configured to:
receive from the server the shared message comprising the unread mark after the client device logs into the first communication account;
output read reminding information according to the shared message;
determine a maximum time stamp from first time stamps of unread marks of all shared messages read by a user, when detecting that the user reads the shared message comprising the unread mark according to the read reminding information;
generate the read mark when detecting that a user reads the shared message according to the read reminding information, wherein the read mark comprises the maximum time stamp and the unread mark comprises a first ID and a first time stamp; and
report to the server the read mark, which renders the server to inform at least one other client device of the plurality of devices that logs into the first communication account that a reading state of the shared message with the unread mark is changed from an unread state to a read state upon receipt of the read mark, and renders the server to delete the shared message read by the one of the plurality of client devices from the unread message list.

* * * * *